United States Patent [19]

Boudot

[11] 4,404,290

[45] Sep. 13, 1983

[54] GLASSES OF HIGH REFRACTIVE INDEX, LOW DISPERSION, AND LOW DENSITY

[75] Inventor: Jean E. Boudot, Avon, France

[73] Assignee: Corning Glass Works, Corning, N.Y.

[21] Appl. No.: 445,956

[22] Filed: Dec. 1, 1982

[30] Foreign Application Priority Data

Jul. 16, 1982 [FR] France ................. 82 12447

[51] Int. Cl.$^3$ ................. C03C 3/08
[52] U.S. Cl. ................. 501/78; 501/79; 501/903
[58] Field of Search ................. 501/78, 79, 903

[56] References Cited

U.S. PATENT DOCUMENTS

| | | | |
|---|---|---|---|
| 4,055,435 | 10/1977 | Sagara | 501/78 |
| 4,084,978 | 4/1978 | Sagara | 501/78 |
| 4,252,567 | 2/1981 | Ishibashi et al. | 501/78 |

FOREIGN PATENT DOCUMENTS

| | | | |
|---|---|---|---|
| 53-4024 | 1/1978 | Japan | 501/78 |
| 54-3115 | 1/1979 | Japan | 264/1.2 |

*Primary Examiner*—Helen M. McCarthy
*Attorney, Agent, or Firm*—C. S. Janes, Jr.

[57] ABSTRACT

This invention relates to the production of glasses especially suitable for ophthalmic lenses, the glasses exhibiting refractive indices between about 1.695–1.705, dispersive indices between about 40.5–43.2, densities below about 3.2 g/cm$^3$, weight losses as measured in the AO test of less than 0.15 mg/cm$^2$, transmittances at 400 nm in 10 mm thickness of at least 75%, and consisting essentially, in weight percent of

| | |
|---|---|
| CaO | 16–21.5 |
| La$_2$O$_3$ | 6–15 |
| TiO$_2$ | 3.5–<9 |
| Al$_2$O$_3$ | 5.5–12 |
| Nb$_2$O$_5$ | 3–11 |
| ZrO$_2$ | 2–10 |
| B$_2$O$_3$ | 20.5–25 |
| SiO$_2$ | 16–20 |

3 Claims, No Drawings

GLASSES OF HIGH REFRACTIVE INDEX, LOW DISPERSION, AND LOW DENSITY

BACKGROUND OF THE INVENTION

The present invention relates to optical glasses, in particular glasses designed for use in high correction ophthalmic lenses.

The use of glasses having a high index of refraction, viz., about 1.70, instead of classic glasses having an index of refraction of about 1.523, makes it possible to reduce the curvatures and, consequently, to decrease the thickness of a lens. This feature leads to two advantages:

First, the lens weighs less (assuming the density of the glass is not too high, i.e., typically less than 3.2 g/cm$^3$, which characteristic precludes the use of the classic "flint" glasses of high index containing BaO and PbO) making for greater comfort for the spectacle wearer; and Second, the aesthetic appearance of the lens is considerably improved.

Nevertheless, as a general rule, increasing the refractive index of a glass leads to a decrease in the Abbe number (or an increase in the dispersion) of the glass. If the dispersion of a glass is too high, chromatic aberration ("iridescence" at the edge of a lens for example) becomes substantial. As a consequence, a high Abbe number (generally greater than 34) is sought, concurrently with a low density and high refractive index.

U.S. Pat. No. 4,057,435 discloses glasses demonstrating refractive indices of about 1.7 or higher, an Abbe number of at least 40, a density of about 3 g/cm$^3$, and a weight loss, as measured in the AO test, of less than 5 mg/cm$^2$. Those glasses consisted essentially, expressed in terms of weight percent on the oxide basis, of about

| | |
|---|---|
| CaO | 18–28 |
| BaO | 0–15 |
| CaO + BaO | 20–34 |
| La$_2$O$_3$ | 9–15 |
| TiO$_2$ | 9–15 |
| MgO | 0–5 |
| Na$_2$O | 0–4 |
| Li$_2$O | 0–4 |
| Na$_2$O + Li$_2$O | 0–4 |
| Al$_2$O$_3$ | 0–5 |
| Gd$_2$O$_3$ | 0–5 |
| Y$_2$O$_3$ | 0–5 |
| Nb$_2$O$_5$ | 0–5 |
| ZrO$_2$ | 0–4 |
| WO$_3$ | 0–4 |
| ZnO | 0–4 |
| B$_2$O$_3$ | 30–54 |
| SiO$_2$ | remainder but ≦15 |
| B$_2$O$_3$ + SiO$_2$ | 30–54 |

As can be observed, the patented glasses satisfied the above criteria of high correction ophthalmic lenses with regard to refractive index, dispersion, and density. However, an improvement in the chemical durability of the glasses was demanded.

SUMMARY OF THE INVENTION

The primary objective of the instant invention is to provide glasses exhibiting refractive indices (n$_D$) between about 1.695–1.705, dispersive indices (ν$_D$) between 40.5–43.2, densities below about 3.2 g/cm$^3$, and excellent chemical durability as demonstrated by a weight loss in the AO test of less than 0.15 mg/cm$^2$.

Glasses satisfying that objective can be prepared from compositions consisting essentially, expressed in terms of weight percent on the oxide basis, of

| | |
|---|---|
| CaO | 16–21.5 |
| La$_2$O$_3$ | 6–15 |
| TiO$_2$ | 3.5 but <9 |
| Al$_2$O$_3$ | 5.5–12 |
| Nb$_2$O$_5$ | 3–11 |
| ZrO$_2$ | 2–10 |
| B$_2$O$_3$ | 20.5–25 |
| SiO$_2$ | 16–20 |

Upon to 4% total of ZnO and/or MgO and/or SrO and/or BaO may be substituted for up to 4% of the CaO content.

The AO test, commonly employed as a measure of the chemical durability of glasses designed for ophthalmic applications, consists in measuring the loss of weight suffered by a glass sample after being immersed in an aqueous 10% by weight HCl solution for 10 minutes at 25° C. The test method is described in detail in *Applied Optics*, 7, No. 5, page 847, May 1968.

A further advantage which the instant glasses possess, when compared with those cited in U.S. Pat. No. 4,057,435, is greater transmission of visible light. Thus, in the present glasses TiO$_2$ and Nb$_2$O$_5$ are the major components contributing to the high refractive index. TiO$_2$ is the constituent contributing most to the high refractive index and has the added advantage of not unduly affecting the density of the glass. However, it sharply reduces the Abbe number and imparts a yellow coloration to the glass, especially when the glass is prepared in a platinum melting unit, thereby decreasing the visible transmission of the glass. Consequently, at least 3.5% TiO$_2$ will be included in the glass composition to achieve a higher refractive index, but less than 9% to insure good visible transmission, viz., at least 75% at a wavelength of 400 nm.

At least 3% Nb$_2$O$_5$ must be present to obtain the required high refractive index and good chemical durability, but at levels beyond 11% the dispersion and density of the glass become too high. Moreover, the cost of the glass becomes quite high. The major advantage of utilizing Nb$_2$O$_5$ resides in the ability to limit the TiO$_2$ content and thereby obtain glasses with very good transmission in the visible region of the radiation spectrum.

The above-reported ranges of the other glass components are also vital to secure the physical and chemical properties desired. Hence:

at least 16% CaO will be present to achieve acceptable glass density, but at values greater than 21.5% the chemical durability of the glass diminishes;

at least 6% La$_2$O$_3$ will be included to provide low dispersion and high refractive index, but more than 15% adversely affects the chemical durability of the glass and intolerably raises the density thereof;

at least 5.5% Al$_2$O$_3$ is needed to impart resistance to attack by acids and to inhibit a tendency toward opalization (crystallization in the body of the glass and/or on the surface thereof), but it is necessary to restrict the Al$_2$O$_3$ content below 12% to maintain good glass stability relative to devitrification;

at least 2% ZrO$_2$ is useful to enhance chemical durability and increase the refractive index of the glass, but, where the ZrO$_2$ content exceeds 10%, the tendency of the glass to readily devitrify becomes very strong;

at least 20% B$_2$O$_3$ forestalls devitrification, but amounts greater than 25% result in poor chemical durability; and at least 16% SiO$_2$ is necessary to provide the necessary chemical durability, but less than 20% should be present so as to limit the tendency of the glass to devitrify.

CaO is an essential component of the base glass. It is preferred over BaO because of its lesser contribution to glass density, and over MgO because of its greater contribution to refractive index and for the better glass stability that it brings about.

As noted above, ZnO, MgO, SrO, and BaO may be introduced into the glass composition in an amount totaling 4% as a replacement for CaO. However, those oxides offer no significant advantage and the glasses will desirably be free from them.

The preferred glasses consist essentially, expressed in terms of weight percent on the oxide basis, of

| | |
|---|---|
| CaO | 18.5–21.5 |
| La$_2$O$_3$ | 9–13 |
| TiO$_2$ | 5.5–8.5 |
| Al$_2$O$_3$ | 8–10 |
| Nb$_2$O$_5$ | 4–8 |
| ZrO$_2$ | 3.5–9.5 |
| B$_2$O$_3$ | 20.5–23 |
| SiO$_2$ | 18–20 |

FURTHER PRIOR ART

U.S. Pat. No. 4,055,435 discloses two regimes of compositions assertedly operable in producing ophthalmic lenses exhibiting a refractive index of at least 1.69, a dispersive index of at least 39, and a density of not more than 3.2. The first group of glasses constituted essentially, in weight percent, of

| | |
|---|---|
| SiO$_2$ | 20–42 |
| Al$_2$O$_3$ | 5–13 |
| B$_2$O$_3$ | 0–20 |
| SiO$_2$ + Al$_2$O$_3$ + B$_2$O$_3$ | 42–52 |
| CaO | 12–39 |
| MgO | 0–20 |
| CaO + MgO | 22–39 |
| ZrO$_2$ | 0–7 |
| TiO$_2$ | 5–13 |
| Nb$_2$O$_5$ | 0–15 |
| ZrO$_2$ + TiO$_2$ + Nb$_2$O$_5$ | 15–28 |
| BaO | 0–6 |
| SrO | 0–10 |
| ZnO | 0–15 |
| BaO + SrO + ZnO | 0–15 |
| La$_2$O$_3$ | 0–10 |
| Ta$_2$O$_5$ | 0–6 |
| WO$_3$ | 0–10 |
| La$_2$O$_3$ + Ta$_2$O$_5$ + WO$_3$ | 0–10 |

As can be observed, those glasses are essentially derived from the alkaline earth metal oxide-Al$_2$O$_3$-TiO$_2$-SiO$_2$ system to which a multitude of optional ingredients may be added in varying amounts. In contrast, the glasses of the instant invention are based in the borosilicate field with B$_2$O$_3$ constituting a greater proportion of the composition than SiO$_2$. Furthermore, the operable quantities of the eight components of the present inventive glasses are rigorously restricted and extraneous additions thereto are preferably avoided.

The second region of glasses reported in the patent consisted essentially, in weight percent, of

| | |
|---|---|
| SiO$_2$ | 20–52 |
| Al$_2$O$_3$ | 0–13 |
| B$_2$O$_3$ | 0–20 |
| SiO$_2$ + Al$_2$O$_3$ + B$_2$O$_3$ | 40–52 |
| CaO | 1–35 |
| MgO | 0–20 |
| CaO + MgO | 10–35 |
| Li$_2$O | 0–15 |
| Na$_2$O + K$_2$O | 0–15 |
| Li$_2$O + Na$_2$O + K$_2$O | 1–20 |
| TiO$_2$ | 4–12 |
| ZrO$_2$ | 0–11 |
| Nb$_2$O$_5$ | 0–20 |
| TiO$_2$ + ZrO$_2$ + Nb$_2$O$_5$ | 14–30 |
| BaO | 0–8 |
| SrO | 0–12 |
| ZnO | 0–15 |
| BaO + SrO + ZnO | 0–15 |
| La$_2$O$_3$ | 0–12 |
| Ta$_2$O$_5$ | 0–10 |
| WO$_3$ | 0–15 |
| La$_2$O$_3$ + Ta$_2$O$_5$ + WO$_3$ | 0–15 |

It is apparent that the overall ranges of constituents comprising this second group of glasses are somewhat more diffuse than those of the first. However, this second group requires the presence of Li$_2$O and/or Na$_2$O and/or K$_2$O. Accordingly, this second group of patented compositions is even less pertinent to the glasses of the instant invention.

U.S. Pat. No. 4,213,786 describes glasses suitable for ophthalmic lenses having refractive indices between 1.71–1.81, dispersive indices of 30.4–34.4, and densities of 3.4–3.8 consisting essentially, in weight percent, of:

| | |
|---|---|
| SiO$_2$ | 15–20 |
| B$_2$O$_3$ | 10–20 |
| SiO$_2$ + B$_2$O$_3$ | 30–40 |
| La$_2$O$_3$ | 16–26 |
| TiO$_2$ | 15–25 |
| CaO | 8–15 |
| MgO | 0–3 |
| SrO | 1–10 |
| BaO | 0–8 |
| MgO + SrO + BaO | 8–15 |
| CaO + MgO + SrO + BaO | 20–25 |
| ZnO | 0–4 |
| PbO | 0–2 |
| Al$_2$O$_3$ | 0–2 |
| ZrO$_2$ | 0–3 |
| Nb$_2$O$_5$ | 0–5 |
| Ta$_2$O$_5$ | 0–2 |
| P$_2$O$_5$ | 0–3 |
| GeO$_2$ | 0–3 |
| Alkali Metal Oxides | 0–5 |

Not only are those compositions somewhat removed from the ranges of the present invention, most notably with respect to the La$_2$O$_3$, Al$_2$O$_3$, CaO, and TiO$_2$ contents, but also the dispersive indices and the densities thereof are outside of those desired.

British Pat. No. 1,591,210 is concerned with glasses suitable for ophthalmic lenses having refractive indices between 1.68–1.71, dispersive indices of 41.6–46.5, and densities of 2.88–3.18 consisting essentially, in weight percent, of

| | |
|---|---|
| B$_2$O$_3$ | 11–53 |
| CaO | 25–43 |
| Nb$_2$O$_5$ | 0–19 |

|  | -continued |
|---|---|
| TiO$_2$ | 0–15 |
| Nb$_2$O$_5$ + TiO$_2$ | 8–19 |
| SiO$_2$ | 0–36 |
| Y$_2$O$_3$ | 0–11 |
| SrO + BaO + ZnO | 0–7 |
| ZrO$_2$ | 0–11 |
| Li$_2$O + Na$_2$O + K$_2$O | 0–4 |
| MgO | 0–10 |
| PbO | 0–4 |
| Al$_2$O$_3$ | 0–4 |
| La$_2$O$_3$ | 0–15 |
| Ta$_2$O$_5$ | 0–19 |
| WO$_3$ | 0–11 |

Both the CaO and Al$_2$O$_3$ proportions are outside the ranges demanded in the compositions of the instant inventive glasses.

melt, (a conventional fining agent may be added, As$_2$O$_3$ being preferable to Sb$_2$O$_3$), deposited into platinum crucibles, and melted at a temperature between about 1320°–1400° C. for about 2–5 hours to achieve homogeneity and refining of the glass. The melts were run into molds and the glass articles annealed for one hour at about 670°–710° C.

Table II also records values of refractive index (n$_D$) and Abbe number ($\nu_D$), as measured after annealing at 60° C./ hour, the glass density (Density) expressed in terms of g/cm$^3$, as measured via the standard water immersion method, the weight loss (Wt. Loss) expressed in terms of mg/cm$^2$, as measured in the AO test, and the visible transmittance (Trans) expressed in terms of percent, as measured at 400 nm on polished plate samples having a thickness of 10 mm utilizing a spectrophotometer.

TABLE II

|  | 1 | 2 | 3 | 4 | 5 | 6 | 7 | 8 |
|---|---|---|---|---|---|---|---|---|
| SiO$_2$ | 16.3 | 19.78 | 19.28 | 19.8 | 19.28 | 19.5 | 19.3 | 19.3 |
| B$_2$O$_3$ | 21.7 | 24.2 | 20.7 | 21.2 | 21.2 | 24.0 | 21.2 | 21.2 |
| Al$_2$O$_3$ | 11.5 | 5.93 | 8.93 | 8.9 | 8.93 | 7.3 | 8.9 | 8.9 |
| CaO | 19.9 | 18.33 | 19.63 | 16.3 | 21.03 | 19.9 | 19.8 | 20.4 |
| La$_2$O$_3$ | 11.7 | 9.8 | 12.8 | 11.8 | 10.8 | 6.4 | 14.0 | 10.8 |
| ZrO$_2$ | 4.5 | 8.46 | 4.46 | 8.5 | 5.96 | 8.6 | 2.4 | 9.6 |
| Nb$_2$O$_5$ | 8.0 | 7.96 | 7.96 | 8.0 | 6.46 | 8.0 | 7.9 | 3.4 |
| TiO$_2$ | 6.4 | 5.54 | 6.24 | 5.5 | 6.34 | 6.3 | 6.5 | 6.4 |
| n$_D$ | 1.7031 | 1.7002 | 1.7047 | 1.7012 | 1.7007 | 1.6983 | 1.7014 | 1.6993 |
| $\nu_D$ | 41.7 | 41.8 | 41.8 | 41.5 | 42.4 | 41.5 | 42.0 | 43.0 |
| Density | 3.17 | 3.15 | 3.20 | 3.19 | 3.17 | 3.10 | 3.19 | 3.18 |
| Wt. Loss | — | 0.07 | — | — | — | — | — | — |
| Trans | 75.8 | 77.8 | 77.6 | 76.0 | 78.1 | 76.1 | 76.5 | 78.8 |

|  | 9 | 10 | 11 | 12 | 13 | 14 | 15 | 16 |
|---|---|---|---|---|---|---|---|---|
| SiO$_2$ | 19.28 | 19.4 | 17.78 | 17.78 | 19.78 | 19.28 | 19.3 | 19.28 |
| B$_2$O$_3$ | 21.7 | 21.7 | 23.2 | 21.2 | 21.2 | 21.7 | 21.2 | 21.7 |
| Al$_2$O$_3$ | 8.93 | 8.9 | 8.93 | 10.93 | 8.93 | 8.93 | 8.9 | 8.93 |
| CaO | 19.63 | 20.5 | 18.33 | 18.33 | 19.63 | 19.63 | 20.9 | 20.13 |
| La$_2$O$_3$ | 11.8 | 12.0 | 9.8 | 9.8 | 9.8 | 11.8 | 12.4 | 11.8 |
| ZrO$_2$ | 4.46 | 3.95 | 8.46 | 8.46 | 6.46 | 4.46 | 2.4 | 4.46 |
| Nb$_2$O$_5$ | 10.46 | 5.4 | 7.96 | 7.96 | 7.96 | 7.96 | 7.9 | 5.96 |
| TiO$_2$ | 3.74 | 8.15 | 5.54 | 5.54 | 6.24 | 6.24 | 7.0 | 7.74 |
| n$_D$ | 1.6957 | 1.7017 | 1.7016 | 1.7022 | 1.7013 | 1.7016 | 1.7027 | 1.7020 |
| $\nu_D$ | 43.1 | 41.7 | 41.8 | 41.4 | 41.6 | 41.6 | 41.7 | 41.7 |
| Density | 3.18 | 3.16 | 3.16 | 3.17 | 3.16 | 3.17 | 3.17 | 3.16 |
| Wt. Loss | — | — | 0.07 | 0.06 | 0.07 | 0.09 | 0.12 | — |
| Trans | 80.9 | 75.3 | 78.0 | 77.5 | 77.7 | 77.1 | 76.6 | 76.0 |

DESCRIPTION OF PREFERRED EMBODIMENTS

Table II reports several compositions, expressed in terms of weight percent on the oxide basis, demonstrative of the inventive glasses. The actual batch ingredients may comprise any materials, either oxides or other compounds, which, when melted together, will be converted into the desired oxide in the proper proportions. Table I recites batch raw materials which were utilized in producing the exemplary compositions of Table II as reported in terms of oxides.

TABLE I

| Oxide | Raw Material |
|---|---|
| SiO$_2$ | SiO$_2$ |
| B$_2$O$_3$ | B(OH)$_3$ |
| Al$_2$O$_3$ | Al(OH)$_3$ |
| CaO | CaCO$_3$, Ca(NO$_3$)$_2$ |
| La$_2$O$_3$ | La$_2$O$_3$ |
| ZrO$_2$ | ZrO$_2$ |
| Nb$_2$O$_5$ | Nb$_2$O$_5$ |
| TiO$_2$ | TiO$_2$ |

The batch ingredients were compounded, thoroughly mixed together to assist in securing a homogeneous

I claim:

1. An optical glass exhibiting an index of refraction between about 1.695–1.705, a dispersive index between about 40.5–43.2, a density below about 3.2 g/cm$^3$, a weight loss as measured in the AO test of less than 0.15 mg/cm$^2$, and a transmittance at 400 nm in 10 mm thickness of at least 75, said glass consisting essentially, expressed in terms of weight percent on the oxide basis, of

| CaO | 16–21.5 |
|---|---|
| La$_2$O$_3$ | 6–15 |
| TiO$_2$ | 3.5–<9 |
| Al$_2$O$_3$ | 5.5–12 |
| Nb$_2$O$_5$ | 3–11 |
| ZrO$_2$ | 2–10 |
| B$_2$O$_3$ | 20.5–25 |
| SiO$_2$ | 16–20 |

2. An optical glass according to claim 1 wherein up to 4% total of at least one of the group ZnO, MgO, SrO, and BaO is substituted for up to 4% CaO.

3. An optical glass according to claim 1 consisting essentially of

| | |
|---|---|
| CaO | 18.5–21.5 |
| La$_2$O$_3$ | 9–13 |
| TiO$_2$ | 5.5–8.5 |
| Al$_2$O$_3$ | 8–10 |

-continued

| | |
|---|---|
| Nb$_2$O$_5$ | 4–8 |
| ZrO$_2$ | 3.5–9.5 |
| B$_2$O$_3$ | 20.5–23 |
| SiO$_2$ | 18–20 |

* * * * *